United States Patent
Hiraiwa et al.

(10) Patent No.: US 9,132,384 B2
(45) Date of Patent: *Sep. 15, 2015

(54) GAS DECOMPOSITION COMPONENT, POWER GENERATION APPARATUS, AND METHOD FOR DECOMPOSING GAS

(75) Inventors: Chihiro Hiraiwa, Osaka (JP); Masatoshi Majima, Itami (JP); Tetsuya Kuwabara, Osaka (JP); Tomoyuki Awazu, Itami (JP); Naho Mizuhara, Itami (JP); Toshio Ueda, Itami (JP); Hideyuki Doi, Itami (JP); Toshiyuki Kuramoto, Itami (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 225 days.

This patent is subject to a terminal disclaimer.

(21) Appl. No.: 13/882,603

(22) PCT Filed: Oct. 21, 2011

(86) PCT No.: PCT/JP2011/074248
§ 371 (c)(1),
(2), (4) Date: Apr. 30, 2013

(87) PCT Pub. No.: WO2012/060228
PCT Pub. Date: May 10, 2012

(65) Prior Publication Data
US 2013/0224612 A1    Aug. 29, 2013

(30) Foreign Application Priority Data

Nov. 2, 2010 (JP) .................................. 2010-245892

(51) Int. Cl.
*B01D 53/32* (2006.01)
*H01M 8/06* (2006.01)
(Continued)

(52) U.S. Cl.
CPC .............. *B01D 53/326* (2013.01); *B01D 53/32* (2013.01); *H01M 8/04007* (2013.01);
(Continued)

(58) Field of Classification Search
CPC .. Y02E 60/521; Y02E 60/525; B01D 53/326; H01M 8/1002; H01M 8/243; H01M 8/0681; H01M 8/222
USPC ........................................................ 429/410
See application file for complete search history.

(56) References Cited

U.S. PATENT DOCUMENTS

| 4,751,152 A | 6/1988 | Zymboly |
| 4,831,965 A | 5/1989 | Brian et al. |

(Continued)

FOREIGN PATENT DOCUMENTS

| JP | 7-31966 A | 2/1995 |
| JP | 7-116650 A | 5/1995 |

(Continued)

*Primary Examiner* — Stewart Fraser
(74) *Attorney, Agent, or Firm* — Drinker Biddle & Reath LLP

(57) ABSTRACT

Provided are a gas decomposition component, a power generation apparatus including the gas decomposition component, and a method for decomposing a gas. A gas decomposition component includes a cylindrical MEA including a first electrode layer, a cylindrical solid electrolyte layer, and a second electrode layer in order from an inside toward an outside, in a layered structure; a first gas channel through which a first gas that is decomposed flows, the first gas channel being disposed inside the cylindrical MEA; and a second gas channel through which a second gas flows, the second gas channel being disposed outside the cylindrical MEA, wherein the gas decomposition component further includes a heater for heating the entirety of the component; and a preheating pipe through which the first gas to be introduced into the first gas channel passes beforehand to be preheated.

12 Claims, 6 Drawing Sheets

(51) Int. Cl.
*H01M 8/04* (2006.01)
*H01M 8/22* (2006.01)
*H01M 8/24* (2006.01)

(52) U.S. Cl.
CPC ........... *H01M 8/0681* (2013.01); *H01M 8/222* (2013.01); *H01M 8/243* (2013.01); *B01D 2257/406* (2013.01); *B01D 2258/0216* (2013.01); *H01M 2250/00* (2013.01); *Y02E 60/50* (2013.01)

(56) References Cited

U.S. PATENT DOCUMENTS 5,244,752 A * 9/1993 Zymboly ...................... 429/456
2009/0176136 A1 7/2009 Poshusta et al.
2011/0177407 A1 * 7/2011 Majima et al. ................ 429/422
2013/0171542 A1 * 7/2013 Hiraiwa et al. ............... 429/497

FOREIGN PATENT DOCUMENTS

| | | |
|---|---|---|
| JP | 11-347535 A | 12/1999 |
| JP | 3238086 B2 | 12/2001 |
| JP | 2003-45472 A | 2/2003 |
| JP | 2004-152723 | 5/2004 |
| JP | 2004-247232 A | 9/2004 |
| JP | 2004-332047 A | 11/2004 |
| JP | 2004-335164 A | 11/2004 |
| JP | 2005-174566 A | 6/2005 |
| WO | WO-2010/035691 A1 | 4/2010 |

* cited by examiner

GAS DECOMPOSITION COMPONENT, POWER GENERATION APPARATUS, AND METHOD FOR DECOMPOSING GAS

DESCRIPTION

1. Technical Field

The present invention relates to a gas decomposition component, a power generation apparatus, and a method for decomposing a gas. Specifically, the present invention relates to a gas decomposition component that can efficiently decompose a predetermined gas, a power generation apparatus including the gas decomposition component, and a method for decomposing a gas.

2. Background Art

For example, although ammonia is an essential compound in agriculture and industry, it is hazardous to humans and hence there are various known methods for decomposing ammonia in water and the air. A method for removing ammonia through decomposition from water containing ammonia at a high concentration has been proposed: aqueous ammonia being sprayed is brought into contact with airflow to separate ammonia in the air and the ammonia is brought into contact with a hypobromous acid solution or sulfuric acid (Patent Literature 1). Other methods have also been proposed: ammonia is separated in the air by the same process as in the above-described method and the ammonia is incinerated with a catalyst (Patent Literature 2); and ammonia-containing wastewater is decomposed with a catalyst into nitrogen and water (Patent Literature 3). In general, waste gas from semiconductor fabrication equipment contains ammonia, hydrogen, and the like. To completely remove the odor of ammonia, the amount of ammonia needs to be reduced to the ppm order. For this purpose, a method has been commonly used in which waste gas to be released from semiconductor equipment is passed through scrubbers so that water containing chemicals absorbs the hazardous gas. On the other hand, in order to decompose a hazardous gas at a low running cost without supply of energy, chemicals, or the like, a treatment method for waste gas from semiconductor fabrication equipment or the like has also been proposed: ammonia is decomposed with a phosphoric acid fuel cell (Patent Literature 4).

CITATION LIST

Patent Literature

PTL 1: Japanese Unexamined Patent Application Publication No. 7-31966
PTL 2: Japanese Unexamined Patent Application Publication No. 7-116650
PTL 3: Japanese Unexamined Patent Application Publication No. 11-347535
PTL 4: Japanese Unexamined Patent Application Publication No. 2003-45472
PTL 5: Japanese Patent No. 3238086

SUMMARY OF INVENTION

Technical Problem

Ammonia can be decomposed by the method of using a chemical solution such as a neutralizing agent as described in PTL 1, the incineration method as described in PTL 2, or the method employing a thermal decomposition reaction with a catalyst as described in PTL 3. However, these methods have problems that they require chemicals and external energy (fuel) and also require periodic replacement of the catalyst, resulting in high running costs.

In addition, such an apparatus has a large size and it is difficult to provide a space for additional installation of the apparatus in existing equipment. The apparatus in which a phosphoric acid fuel cell is used to remove ammonia in waste gas from compound semiconductor fabrication also has a problem: since the electrolyte is liquid, the size of air-side and ammonia-side separators cannot be reduced and it is difficult to reduce the size of the apparatus.

In order to address the above-described problems, as described in PTL 5, a cylindrical membrane electrode assembly (MEA) may be employed that includes a cylindrical solid electrolyte layer, and a first electrode layer and a second electrode layer that are formed on the inner and outer surfaces of the solid electrolyte layer so as to sandwich the solid electrolyte layer in a layered structure. A gaseous fluid containing a gas to be decomposed is made to flow through the inner space of the cylindrical MEA in the axial direction.

In order to decompose the gas, the temperature of the gaseous fluid containing the gas is preferably increased as high as possible and the gas is supplied to the first electrode layer (fuel electrode) of the cylindrical MEA. For this reason, a heater that heats the entirety of the cylindrical MEA is provided.

In order to decompose a large amount of a gas, the flow rate of the gas flowing through the cylindrical MEA needs to be increased. However, when the gas flow rate is increased, the gas that is not sufficiently heated is supplied to the cylindrical MEA and the gas decomposition efficiency is decreased, which is problematic.

In order to efficiently decompose the gas flowing through the cylindrical MEA, the gas needs to be heated to a high temperature. The smaller the size of the cylindrical MEA, the lower the efficiency of heating the gas, which is problematic.

In addition, in an existing cylindrical MEA, connection members are connected to both end portions of the cylindrical MEA so that a gas is made to flow through the cylindrical MEA in the axial direction. However, since the entirety of the cylindrical MEA is kept at a high temperature, the effect of sealing between both end portions of the cylindrical MEA and the connection members tends to degrade and the connection reliability is low, which is problematic.

An object of the present invention is to provide a gas decomposition component in which an electrochemical reaction using a solid electrolyte layer is employed to reduce the running cost and to provide high treatment performance, and the temperature of a gas flowing through a cylindrical MEA is efficiently increased to enhance the gas decomposition efficiency; a power generation apparatus including the gas decomposition component; and a method for decomposing a gas.

Solution to Problem

In order to achieve the object, a first embodiment of the present invention provides a gas decomposition component including a cylindrical MEA including a cylindrical solid electrolyte layer, a first electrode layer formed on an inner circumferential portion of the solid electrolyte layer in a layered structure, and a second electrode layer formed on an outer circumferential portion of the solid electrolyte layer in a layered structure; a first gas channel through which a first gas that is decomposed flows, the first gas channel being disposed inside the cylindrical MEA; and a second gas channel through which a second gas flows, the second gas channel being disposed outside the cylindrical MEA, wherein the gas decomposition component further includes a heater for heating entirety of the component; and a preheating pipe through which the first gas to be introduced into the first gas channel passes beforehand to be preheated.

The term "MEA" is an abbreviation of a membrane electrode assembly and can be translated into a Japanese term "maku/denkyoku setsugotai". However, since the term "MEA" is also a well-known technical term for those skilled in the art, this term is used herein without being translated.

According to the first embodiment of the present invention, before the first gas that is decomposed is introduced into the first gas channel of the gas decomposition component, the first gas is introduced into the preheating pipe and preheated in the preheating pipe by the heater. Since the first gas having been preheated is introduced into the first gas channel, heating to a predetermined temperature in the first gas channel can be efficiently and rapidly achieved.

Thus, the decomposition efficiency of the first gas can be enhanced. The flow rate of the first gas can be increased to enhance the treatment performance. The gas decomposition component having a shorter length can be provided.

According to a second embodiment of the present invention, in the gas decomposition component of the first embodiment, the heater and the preheating pipe are provided for the each gas decomposition component.

According to the second embodiment of the present invention, in addition to the operation and effect due to the first embodiment, each gas decomposition component includes the heater and the preheating pipe. Thus, even when a single gas decomposition component is used to decompose a gas, the gas decomposition efficiency can be enhanced with certainty. Alternatively, when a plurality of gas decomposition components are used to decompose a gas, the gas decomposition efficiency in each gas decomposition component can be enhanced with certainty and significant advantages can be provided on the whole.

According to a third embodiment of the present invention, in the gas decomposition component of the first embodiment, a plurality of the gas decomposition components serving as a gas decomposition component group share the heater and the preheating pipe.

According to the third embodiment of the present invention, in addition to the operation and effect due to the first embodiment, a plurality of the gas decomposition components serving as a gas decomposition component group share the heater and the preheating pipe. As a result, a gas decomposition component that includes a gas decomposition component group and has a compact size on the whole can be provided; and the first gas can be preheated with certainty and then supplied to the gas decomposition components. Needless to say, an increase in the heating capability of the heater and an increase in the number of the preheating pipe can be easily achieved. Accordingly, the total flow rate of the first gas having been preheated can be increased to efficiently perform the gas decomposition.

According to a fourth embodiment of the present invention, in the gas decomposition component of any one of the first to third embodiments, a sealed portion for sealing an end portion of the cylindrical MEA is provided, a gas guide pipe is inserted through another end portion of the cylindrical MEA into an inner space of the cylindrical MEA to form a cylindrical channel between the gas guide pipe and an inner circumferential surface of the cylindrical MEA, and, in the first gas channel, the first gas flowing through the gas guide pipe toward the sealed portion is made to flow out of the gas guide pipe in a region near the sealed portion so that a flow direction of the first gas is reversed and the first gas flows through the cylindrical channel in a direction opposite to the flow direction in the guide pipe.

According to the fourth embodiment of the present invention, in addition to the operation and effect due to any one of the first to third embodiments, in a gas decomposition component according to the present invention, the gas to be decomposed is made to flow through the gas guide pipe toward the end portion having the sealed portion; the flow direction of the gas is reversed in a region near the sealed portion and the gas is made to flow through the cylindrical channel in a direction opposite to the flow direction in the gas guide pipe, the cylindrical channel being formed between the outer circumferential surface of the gas guide pipe and the inner circumferential surface of the cylindrical MEA.

When the above-described configuration is employed, the gas is made to flow for a distance equal to twice the cylinder length of the cylindrical MEA. Accordingly, after the temperature of the gas is increased by sufficient heating within the guide pipe, the gas can be supplied to the cylindrical MEA. As a result, the gas decomposition efficiency can be enhanced and the gas flow rate can be increased to increase the gas treatment rate.

An inlet and an outlet for the gas in a cylindrical MEA can be both located in a single end portion of the cylindrical MEA. As a result, the reliability of sealing between the cylindrical MEA and gas pipes can be enhanced.

The configuration in which an end portion of the cylindrical MEA is sealed is not particularly limited. For example, according to an eighth embodiment of the present invention described below, the end portion of the cylindrical MEA may be sealed with a bottom portion formed from an extension of the solid electrolyte layer. The bottom portion is formed as an integral part of the cylindrical MEA. Accordingly, gas leakage does not occur and the end portion of the cylindrical MEA can be sealed with certainty.

Alternatively, according to a ninth embodiment of the present invention described below, the end portion of the cylindrical MEA may be sealed with a sealing member engaged with the end portion of the cylindrical MEA. By employing such a configuration, the present invention can be applied to an existing cylindrical MEA having two open ends.

A gas inlet and a gas outlet in the cylindrical MEA can be constituted by a pipe member having a double structure for the purpose of not causing mixing of a gas to be decomposed and a decomposed gas.

According to a fifth embodiment of the present invention, in the gas decomposition component of the fourth embodiment, the gas guide pipe is formed of a conductive material, and the gas guide pipe is electrically connected to the first electrode layer to constitute a collector for the first electrode layer.

According to the fifth embodiment, in addition to the operation and effect due to the fourth embodiment, by using the gas guide pipe as a collector for the first electrode layer, the gas decomposition efficiency can be enhanced and the space within the cylindrical MEA can also be effectively used.

A material for forming the gas guide pipe is not particularly limited unless corrosion or the like is caused by a gas to be decomposed. The gas guide pipe may be formed of, for example, stainless steel, copper, nickel, or a Ni-based alloy containing iron, chromium, niobium, or molybdenum, such as inconel.

A technique of establishing an electrical connection between the first electrode layer and the gas guide pipe is not particularly limited. For example, a porous metal body may be inserted into a cylindrical channel formed between the inner circumferential surface of the cylindrical MEA and the outer circumferential surface of the gas guide pipe to thereby establish an electrical connection between the first electrode layer and the gas guide pipe. By disposing the porous metal body, the gas guide pipe can be held within the cylindrical MEA and the cylindrical channel between the inner circumferential surface of the first electrode layer and the outer circumferential surface of the gas guide pipe can also be ensured. However, for example, when the cylindrical MEA has a small diameter, it is difficult to achieve a large contact area or a high contact pressure between the porous metal body and the first electrode layer and the gas guide pipe; thus, the resistance between these members may be high.

Regarding a technique for avoiding such a disadvantage, there is a sixth embodiment.

According to the sixth embodiment of the present invention, in the gas decomposition component of the fourth or fifth embodiment, a conductive metal mesh sheet is disposed on an inner circumferential surface of the first electrode layer, and the metal mesh sheet is connected to the gas guide pipe to establish an electrical connection between the first electrode layer and the gas guide pipe.

According to the sixth embodiment, in addition to the operation and effect due to the fourth or fifth embodiment, a conductive mesh sheet is disposed on an inner circumferential surface of the first electrode layer, and this metal mesh sheet is connected to the gas guide pipe to establish an electrical connection between the first electrode layer and the gas guide pipe.

By holding the metal mesh sheet so as to be in contact with the first electrode layer, the resistance between the electrode layer and the metal mesh sheet can be decreased.

In addition, by directly connecting the metal mesh sheet to the gas guide pipe, the contact resistance with the collector can be decreased. For example, a single metal mesh sheet may be disposed so as to be in contact with the entirety of the inner circumferential surface of the first electrode layer.

When the above-described configuration is employed, the collector can be made to have a large area by using the gas guide pipe. Thus, the gas decomposition efficiency can be further enhanced.

The porous metal body may be inserted between the metal mesh sheet and the gas guide pipe to back up the metal mesh sheet from inside. As a result, the contact resistance between the first electrode layer and the collector can be decreased. In such a configuration, the following two conduction paths are formed: (1) Ni mesh sheet/porous metal body/gas guide pipe and (2) Ni mesh sheet/gas guide pipe. As a result, while the contact resistance of the anode collector can be further decreased, an increase in pressure loss can be suppressed.

The form of the metal mesh sheet is not particularly limited. For example, the metal mesh sheet may be formed in the shape of a cylinder and disposed so as to cover the entire surface of the first electrode layer.

The appearance configuration of the metal mesh sheet is also not particularly limited. For example, a woven fabric, a nonwoven fabric, or a perforated sheet may be employed. In order to ensure flexibility, uniformity of pore size, or the like, a woven fabric is preferably employed.

A metal material for forming the metal mesh sheet is also not particularly limited. For example, a metal mesh sheet formed of a material such as Ni, Ni—Fe, Ni—Co, Ni—Cr, or Ni—W is preferably employed. A metal mesh sheet having a surface layer such as a silver-plated layer may be employed. When the occurrence of a catalytic reaction is intended, a metal mesh sheet formed of a material such as Ni-W is preferably employed.

According to a seventh embodiment of the present invention, in the gas decomposition component of any one of the first to sixth embodiments, a porous conductive layer is disposed on a surface of the first electrode layer.

According to the seventh embodiment, in addition to the operation and effect due to any one of the first to sixth embodiments, by forming the conductive layer on the surface of the first electrode layer, conductivity between the first electrode layer and the mesh sheet can be ensured in the entire region. Since the conductive layer is porous, the gas is not prevented from coming into contact with each electrode layer.

There may be cases where it is difficult to achieve uniform contact between the metal mesh sheet and the entirety of the inner circumferential surface of the first electrode layer. Specifically, the contact pressure between the surface of the first electrode layer and the metal mesh sheet may be varied or the metal mesh sheet may be partially separated from the surface of the first electrode layer. The occurrence of such phenomena can be suppressed by forming the porous conductive layer on the surface of the first electrode layer.

The porous conductive layer disposed may be a porous conductive-paste-coated layer. By disposing a porous conductive-paste-coated layer on the inner circumferential surface of the first electrode layer, an electrical connection between the first electrode layer and the metal mesh sheet is established with certainty with the conductive-paste-coated layer therebetween; and the electric resistance between the first electrode layer and the metal mesh sheet can also be decreased.

Specifically, by disposing the conductive-paste-coated layer, a surface of the metal mesh sheet is partially embedded in the conductive-paste-coated layer so that the electrical connection between the metal mesh sheet and the first electrode layer can be established with certainty; thus, the contact resistance therebetween can be considerably decreased. In addition, the entire surface of the metal mesh sheet can be uniformly made to be in contact with the first electrode layer. Accordingly, a local increase in the electric resistance between the first electrode layer and the metal mesh sheet does not occur.

By forming the conductive-paste-coated layer by application over the entire surface of the first electrode layer, even when the metal mesh sheet is separated from the conductive-paste-coated layer, current collection on the surface of the first electrode layer can be ensured. Thus, even when a portion of the metal mesh sheet is separated from the conductive-paste-coated layer due to the influence of, for example, temperature, the current-collecting effect is not degraded. In addition, since the conductive-paste-coated layer is porous, the gas is not prevented from coming into contact with the first electrode layer. Accordingly, the electrochemical reaction can be uniformly caused in the entire region of the first electrode layer to considerably enhance the gas decomposition reaction efficiency. Thus, the gas decomposition treatment performance can be enhanced.

The porous conductive-paste-coated layer can be formed from pastes containing various conductive particles. For example, the porous conductive-paste-coated layer can be formed from a paste containing silver particles. Silver particles have high conductivity and can cause a decrease in the electric resistance of the collector for the first electrode layer to enhance the gas decomposition treatment performance. Silver particles also have high stability and are not substantially oxidized.

According to an eighth embodiment of the present invention, in the gas decomposition component of any one of the fourth to seventh embodiments, the end portion of the cylindrical MEA is sealed with a bottom portion formed from an extension of the solid electrolyte layer.

According to the eighth embodiment, in addition to the operation and effect due to any one of the fourth to seventh embodiments, by forming the solid electrolyte layer in the shape of a cylinder having a bottom in advance, a cylindrical MEA having a sealed end portion can be easily provided. Thus, the direction of the gas flow can be easily reversed in the gas decomposition component.

According to a ninth embodiment of the present invention, in the gas decomposition component of any one of the fourth to seventh embodiments, the end portion of the cylindrical MEA is sealed with a sealing member engaged with the end portion of the cylindrical MEA.

According to the ninth embodiment, in addition to the operation and effect due to any one of the fourth to seventh embodiments, a sealing member that is an independent member is engaged with the end portion of the cylindrical MEA to seal the end portion of the cylindrical MEA. Thus, the solid electrolyte layer of the cylindrical MEA can be used in the shape of a cylinder and the cylindrical MEA can be easily produced.

According to a tenth embodiment of the present invention, in the gas decomposition component of any one of the first to ninth embodiments, the first electrode layer and/or the second electrode layer is a fired body containing an ion-conductive ceramic and metal chain particles mainly containing nickel (Ni).

The metal chain particles denote an elongated moniliform metal substance in which metal particles are connected together.

The metal chain particles are preferably formed of Ni, Fe-containing Ni, Ni containing a trace amount of Ti, or Fe-containing Ni containing a trace amount of Ti. When the surface of Ni or the like is oxidized, the surfaces of the metal chain particles are oxidized while the contents (portions inside the surface layers) are not oxidized and have metal conductivity.

Accordingly, for example, when ions moving through the solid electrolyte layer are anions (the ions may be cations), the following effects are provided.

(A1) When the first electrode layer (anode) is formed so as to contain metal chain particles, in the first electrode layer (anode), the chemical reaction between the anions moving through the solid electrolyte layer and gas molecules in a gaseous fluid introduced into the first electrode layer (anode) from the outside thereof is promoted (catalysis) with the oxide layers of the metal chain particles and the chemical reaction in the first electrode layer (anode) is also promoted (promotion effect due to charges) through participation of the anions. The conductivity of electrons generated by the chemical reaction can be ensured in the metal portions of the metal chain particles. As a result, the electrochemical reaction accompanying giving and receiving of charges in the first electrode layer (anode) can be promoted on the whole. When the first electrode (anode) contains metal chain particles, in the first electrode layer (anode), cations such as protons are generated and the cations move through the solid electrolyte layer to the second electrode layer (cathode) to thereby similarly provide the above-described promotion effect due to charges.

Note that, prior to use, the oxide layers of the metal chain particles are formed by firing with certainty; however, during use, the oxide layers are often eliminated by the reduction reaction. Even when the oxide layers are eliminated, the above-described catalysis is not eliminated though it may reduce. In particular, Ni that contains Fe or Ti has high catalysis in spite of the absence of the oxide layers.

(A2) When the second electrode layer (cathode) is formed so as to contain the metal chain particles, in the second electrode layer (cathode), the chemical reaction of gas molecules in a gaseous fluid introduced into the second electrode layer (cathode) from the outside thereof is promoted (catalysis) with the oxide layers of the metal chain particles; and electron conductivity from the external circuit is enhanced and, through participation of the electrons, the chemical reaction in the second electrode layer (cathode) is also promoted (promotion effect due to charges). Thus, anions are efficiently generated from the molecules and can be sent to the solid electrolyte layer. As with (A1), in (A2), the electrochemical reaction among cations having moved through the solid electrolyte layer, electrons having flowed through the external circuit, and the second gas can be promoted. Accordingly, as in the case where the first electrode (anode) contains the metal chain particles, the electrochemical reaction accompanying giving and receiving of charges in the second electrode layer (cathode) can be promoted on the whole. Whether the second electrode layer (cathode) is formed so as to contain the metal chain particles or not depends on the gas to be decomposed.

(A3) When the first electrode layer (anode) and the second electrode layer (cathode) are formed so as to contain the metal chain particles, the above-described effects in (A1) and (A2) can be obtained.

The rates of the above-described electrochemical reactions are often limited by the speed at which ions move through the solid electrolyte layer or the time for which ions move through the solid electrolyte layer. To increase the movement speed of ions, the gas decomposition component is generally equipped with a heating unit such as a heater and heated at a high temperature such as 600° C. to 1000° C. By the heating to a high temperature, in addition to an increase in the movement speed of ions, chemical reactions accompanying giving and receiving of charges in the electrodes can be promoted.

When the ions moving through the solid electrolyte layer are anions, as described above, the anions are generated by the chemical reaction in the second electrode layer (cathode) and supplied. The anions are generated in the second electrode layer (cathode) through the reaction between molecules of a fluid introduced and electrons. The generated anions move through the solid electrolyte layer to the first electrode layer (anode). The electrons participating in the reaction of the second electrode layer (cathode) move from the external circuit (including a capacitor, a power supply, and a power consumption device) connecting the first electrode layer (anode) and the second electrode layer (cathode). When the ions moving thorough the solid electrolyte layer are cations, the cations are generated by the electrochemical reaction in the first electrode layer (anode) and move through the solid electrolyte layer to the second electrode layer (cathode). Electrons are generated in the first electrode layer (anode) and flow through the external circuit to the second electrode layer (cathode) and participate in the electrochemical reaction in the second electrode layer (cathode). The electrochemical reactions may be power generation reactions of a fuel cell or may be electrolytic reactions.

According to an eleventh embodiment of the present invention, in the gas decomposition component of any one of the first to tenth embodiments, the solid electrolyte layer has oxygen-ion conductivity or proton conductivity.

According to the eleventh embodiment, in addition to the operation and effect due to any one of the first to tenth embodiments, when an oxygen-ion-conductive solid electrolyte layer is used, for example, a reaction between electrons and oxygen molecules is caused to generate oxygen ions in the second electrode layer (cathode), the oxygen ions move through the solid electrolyte layer, and the predetermined electrochemical reaction can be caused in the first electrode layer (anode). In this case, since the speed at which the oxygen ions move through the solid electrolyte layer is not higher than that of protons, to achieve a decomposition capacity on the practical level, for example, the following expedients are required: a sufficiently high temperature is provided and/or the thickness of the solid electrolyte layer is made sufficiently small.

On the other hand, regarding a proton-conductive solid electrolyte layer, barium zirconate ($BaZrO_3$) and the like are known. When a proton-conductive solid electrolyte layer is used, for example, ammonia is decomposed in the first electrode layer (anode) to generate protons, nitrogen molecules, and electrons; the protons move through the solid electrolyte layer to the second electrode layer (cathode) and react with oxygen in the second electrode layer (cathode) to generate water ($H_2O$). Protons are smaller than oxygen ions and hence move through the solid electrolyte layer at a higher speed than oxygen ions. Accordingly, at a lower heating temperature, a decomposition capacity on the practical level can be achieved.

For example, when ammonia is decomposed with a cylindrical MEA in which an oxygen-ion-conductive solid electrolyte layer is used, a reaction of generating water is caused in the first electrode layer (anode) of the cylindrical MEA. The water takes the form of water droplets at low-temperature portions near the outlet and may cause pressure loss. In contrast, when a proton-conductive solid electrolyte layer is used, protons, oxygen molecules, and electrons are generated in the second electrode layer (cathode) (outside). Since the outside is substantially open, even when adhesion of water droplets occurs, pressure loss is less likely to be caused.

According to a twelfth embodiment of the present invention, a power generation apparatus includes the gas decomposition component of any one of the first to eleventh embodiments.

The power generation apparatus according to the twelfth embodiment allows power generation employing gas decomposition in which the operation and effect of the gas decomposition component according to any one of the first to eleventh embodiments are exhibited; that is, a fuel cell can be provided.

A thirteenth embodiment of the present invention provides a method for decomposing a gas, the method being performed with a gas decomposition component including a cylindrical MEA including a cylindrical solid electrolyte layer, a first electrode layer formed on an inner circumferential portion of the solid electrolyte layer in a layered structure, and a second electrode layer formed on an outer circumferential portion of the solid electrolyte layer in a layered structure; a first gas channel through which a first gas that is decomposed flows, the first gas channel being disposed inside the cylindrical MEA; and a second gas channel through which a second gas flows, the second gas channel being disposed outside the cylindrical MEA, wherein the first gas to be introduced into the first gas channel is preheated with a heater for heating entirety of the component.

According to the method for decomposing a gas of the thirteenth embodiment, the first gas that is decomposed is, in advance, introduced into the preheating pipe and preheated in the preheating pipe by the heater. Since the first gas having been preheated is then introduced into the first gas channel in the cylindrical MEA, heating to a predetermined temperature in the first gas channel can be efficiently and rapidly achieved.

Thus, the decomposition efficiency of the first gas can be enhanced. The flow rate of the first gas can be increased to enhance the treatment performance.

The gas to be decomposed is also not particularly limited. For example, any one of the above-described gas decomposition components is disposed; and a gas containing ammonia may be employed as the first gas supplied to the first electrode layer and a gas containing oxygen molecules may be employed as the second gas supplied to the second electrode layer. In this case, oxygen ions generated in the second electrode layer (cathode) move to the first electrode layer (anode); the reaction between ammonia and oxygen ions is caused in the first electrode layer under the catalysis due to metal chain particles and the promotion effect due to ions; and electrons generated by the reaction can be rapidly moved.

A gas decomposition component, a power generation apparatus, and a method for decomposing a gas according to the present invention can be used to decompose and detoxify hazardous gas contained in exhaust gas or the like, and can contribute to, for example, size reduction of apparatuses, enhancement of the efficiency, and low running costs in the fields of fuel cells employing fuel gas and original electrochemical reaction apparatuses using gas decomposition.

Advantageous Effects of Invention

A gas decomposition component that has high gas decomposition efficiency, operates at a low running cost, and has high gas decomposition efficiency, a power generation apparatus, and a method for decomposing a gas can be provided.

DESCRIPTION OF EMBODIMENTS

Hereinafter, embodiments of the present invention will be specifically described with reference to the drawings.

Figure 1:
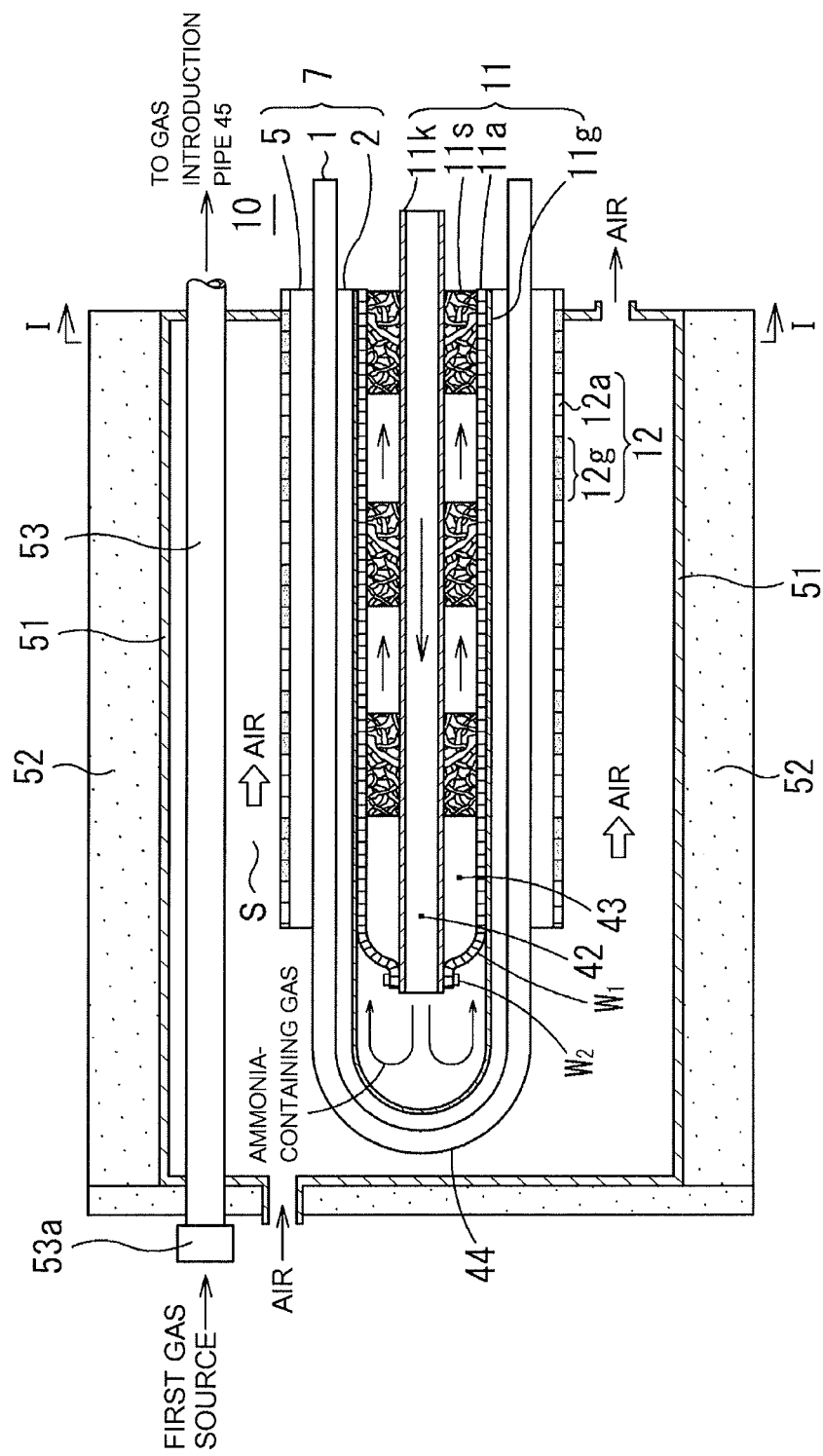
FIG. 1 is a longitudinal sectional view of, on an end side (sealed side), a gas decomposition component according to a first embodiment of the present invention.
Figure 2:
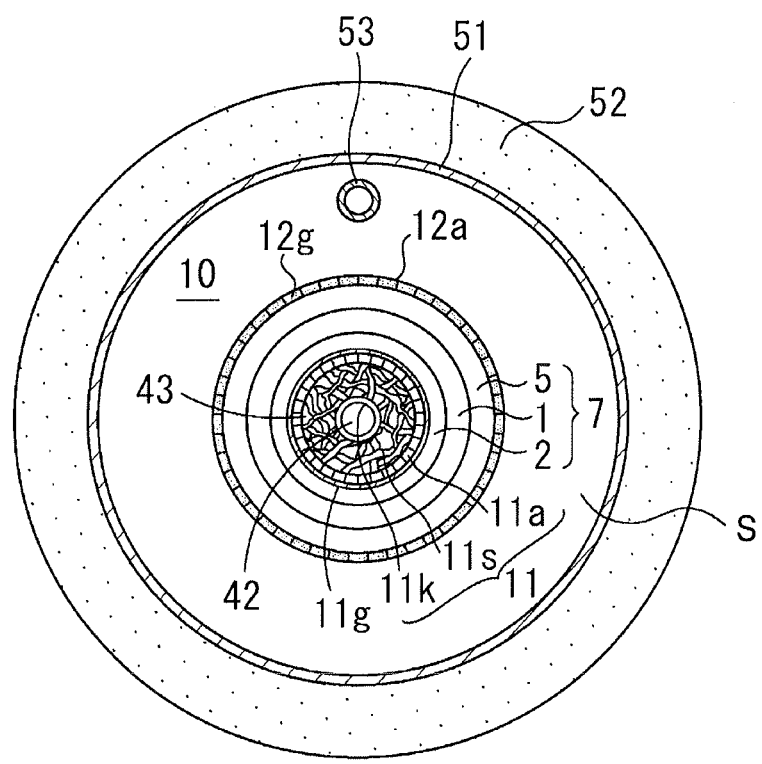
FIG. 2 is a sectional configuration view taken along line I-I in FIG. 1.

FIG. 1 is a longitudinal sectional view of a gas decomposition component 10 according to a first embodiment of the present invention. FIG. 2 is a sectional view taken along line I-I in FIG. 1. In the present embodiment, in particular, a gas decomposition component in which a first gas that is decomposed is an ammonia-containing gas is described.

In the gas decomposition component 10, a first electrode layer (anode) 2 is disposed so as to cover the inner surface of a cylindrical solid electrolyte layer 1, and a second electrode layer (cathode) 5 is disposed so as to cover the outer surface of the solid electrolyte layer 1; thus, a cylindrical MEA 7 (1, 2, 5) is provided. The first electrode layer (anode) 2 may be referred to as a fuel electrode. The second electrode layer (cathode) 5 may be referred to as an air electrode.

As described above, in the present embodiment, an ammonia-containing gas serving as the first gas is made to flow inside the cylindrical MEA 7 (1, 2, 5). The air, which is an oxygen-containing gas, serving as a second gas is made to flow outside the cylindrical MEA 7 (1, 2, 5). A channel through which the first gas flows inside the cylindrical MEA 7 (1, 2, 5) is defined as a first gas channel. A channel through which the second gas flows outside the cylindrical MEA 7 (1, 2, 5) is defined as a second gas channel.

As illustrated in FIG. 1, the cylindrical MEA 7 (1, 2, 5) according to the present embodiment has a right-cylindrical shape. Although the cylindrical MEA 7 (1, 2, 5) has an inner diameter of, for example, about 20 mm, the dimensions and the like thereof may be defined in accordance with apparatuses to which the cylindrical MEA 7 (1, 2, 5) is applied.

In the gas decomposition component 10 according to the present embodiment, an end portion of the cylindrical MEA 7 (1, 2, 5) is sealed and a gas guide pipe 11k is inserted through another end portion of the cylindrical MEA 7 (1, 2, 5). As described above, the gas guide pipe 11k is formed of stainless steel, copper, nickel, or a Ni-based alloy containing iron, chromium, niobium, or molybdenum, such as inconel, that is, a material having heat resistance sufficient for 600° C. to 1000° C. and corrosion resistance to ammonia gas. At the above-described end portion, extensions of the solid electrolyte layer 1 and the inner electrode layer 2 of the cylindrical MEA 7 (1, 2, 5) are used to form a bottom portion; thus, a sealed portion 44 is provided.

The gas guide pipe 11k is inserted through the other end portion toward the above-described end portion, that is, the sealed portion 44, of the cylindrical MEA 7 (1, 2, 5) to form a cylindrical channel 43 between the inner circumferential surface of the first electrode layer 2 of the cylindrical MEA 7 and the outer circumferential surface of the gas guide pipe 11k. In this cylindrical channel 43, a porous metal body 11s is inserted. Thus, the gas guide pipe 11k is held in the central portion of the cylindrical channel 43; and the cylindrical channel 43 is formed between the outer circumferential surface of the gas guide pipe 11k and the inner circumferential surface of the first electrode layer 2.

In the gas decomposition component 10 according to the present embodiment, the first gas is made to flow through an inner space 42 of the gas guide pipe 11k toward the sealed portion 44; the first gas is made to flow out of the gas guide pipe 11k in a region near the sealed portion 44 and the flow direction of the first gas is reversed; and the first gas is made to flow through the cylindrical channel 43 in a direction opposite to the flow direction in the inner space 42.

The inner space 42 and the cylindrical channel 43 constitute the first gas channel.

When such a configuration is employed, the gas flows, within the inner space of the cylindrical MEA 7, through the first gas channel having a distance equal to about twice the cylinder length of the cylindrical MEA 7. Accordingly, after the temperature of the gas is increased by sufficient heating within the gas guide pipe 11k, the gas can be supplied to the cylindrical MEA 7. As a result, the decomposition efficiency of the first gas can be enhanced and the gas flow rate can be increased to increase the gas treatment rate.

The gas guide pipe 11k is formed of a conductive metal such as copper and functions as a member of an anode collector 11. On the other hand, a cathode collector 12 is disposed so as to wind around the outer surface of the second electrode layer (cathode) 5.

The anode collector 11 includes a silver-paste-coated layer 11g, a Ni mesh sheet 11a, the porous metal body 11s, and the gas guide pipe 11k.

The Ni mesh sheet 11a is in contact with the first electrode layer 2 (anode) on the inner-surface side of the cylindrical MEA 7, with the silver-paste-coated layer 11g therebetween, so that electric conduction from the porous metal body 1 is to the gas guide pipe 11k is achieved. In a region near the sealed portion 44, an end portion $W_1$ of the Ni mesh sheet 11a is electrically connected to the gas guide pipe 11k so as to be wound around the outer circumferential portion of the gas guide pipe 11k with a band-shaped connection member $W_2$. Accordingly, the Ni mesh sheet 11a forms, in parallel, (1) an electric conduction path of Ni mesh sheet 11a/porous metal body 11s/gas guide pipe 11k and (2) an electric conduction path of Ni mesh sheet 11a/gas guide pipe 11k. As a result, the anode collector 11 can be provided on the inner surface of the cylindrical MEA 7 such that a low electric resistance can be maintained and an increase in the pressure loss can also be suppressed.

The porous metal body 11s is preferably a metal-plated body that can be formed so as to have a high porosity such as Celmet (registered trademark: Sumitomo Electric Industries, Ltd.) for the purpose of decreasing the pressure loss of the first gas. In order to decrease the electric resistance between the first electrode layer (anode) 2 and the anode collector 11, the silver-paste-coated layer 11g and the Ni mesh sheet 11a are disposed.

The cathode collector 12 includes a silver-paste-coated wiring 12g and a Ni mesh sheet 12a.

Figure 4:
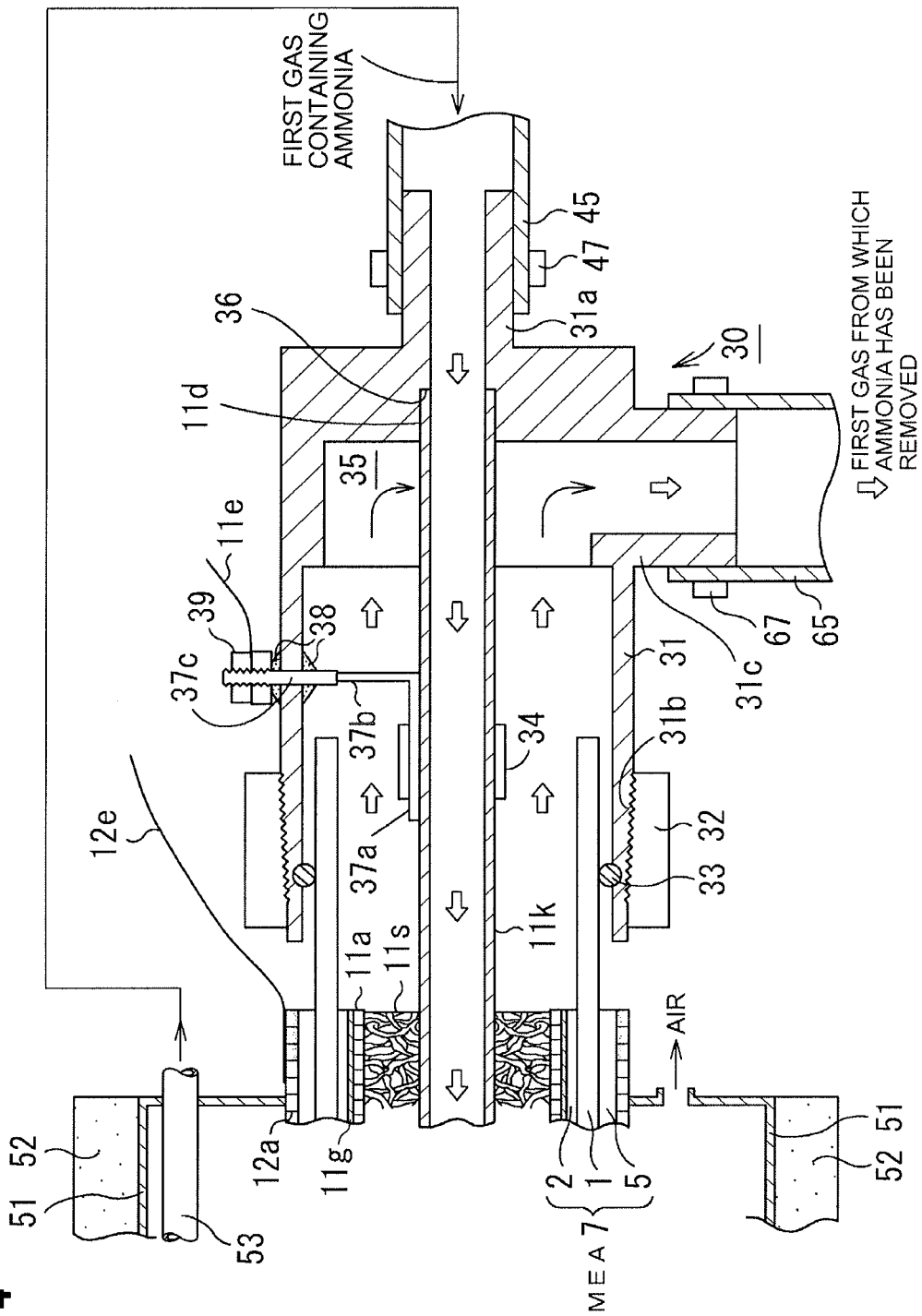
FIG. 4 is a longitudinal sectional configuration view of, on a first-gas inlet-outlet side, the gas decomposition component in FIG. 1.

In the present embodiment, the Ni mesh sheet 12a is in contact with the outer surface of the cylindrical MEA 7 to conduct electricity to an external wiring 12e (refer to FIG. 4).

The silver-paste-coated wiring 12g contains silver serving as a catalyst for promoting decomposition of oxygen, in an oxygen-containing gas (air) serving as the second gas, into oxygen ions in the second electrode layer (cathode) 5 and also contributes to a decrease in the electric resistance of the cathode collector 12.

The silver-paste-coated wiring 12g allows passing of oxygen molecules therethrough and contact of silver particles with the second electrode layer (cathode) 5. Thus, catalysis similar to that would be provided by silver particles contained in the second electrode layer (cathode) 5 is exhibited. In addition, this is less expensive than the case where the second electrode layer (cathode) 5 is formed so as to contain silver particles.

A space S through which the second gas flows is provided outside the cylindrical MEA 7 (1, 2, 5). An exterior member 51 is disposed outside the space S so as to cover the entirety of the cylindrical MEA 7. A heater 52 is disposed outside the exterior member 51.

A preheating pipe 53 is disposed in the space S so as to extend through the exterior member 51.

The heater 52 is used to heat the entirety of the component. The heater 52 heats the entirety of the gas decomposition component 10 to a temperature suitable for decomposition of the first gas.

The preheating pipe 53 is used to preheat the first gas. The first gas to be introduced into the cylindrical MEA 7 is passed through the preheating pipe 53 to thereby preheat the first gas and prevent an inefficient reaction due to direct introduction of the first gas at a low temperature into the cylindrical MEA 7. As a result, the decomposition performance of the gas decomposition component 10 can be enhanced and the size of the gas decomposition component 10 can be reduced.

The preheating pipe 53 includes a connection end 53a for connection with a pipe extending from a first gas source, and a downstream end connected to a gas introduction pipe 45 (refer to FIG. 4).

The preheating pipe 53 may be a heat-resistant pipe such as a Ni pipe or an inconel pipe or a heat- and corrosion-resistant pipe made of another metal or a ceramic.

In FIG. 1, a single preheating pipe 53 is illustrated. However, a plurality of the preheating pipes 53 may be disposed.

The exterior member 51 is formed of a heat-resistant material. The exterior member 51 may be formed of a refractory material so as to have a thick wall in which the heater 52 is embedded. The exterior member 51 may be formed of a refractory material so as to have a thick wall; and the preheating pipe 53 may be embedded in and extends through the thick wall.

The heater 52, which is intended to heat the cylindrical MEA 7, is also used to heat the preheating pipe 53. As a result, the first gas that is decomposed is sufficiently preheated.

Figure 3:
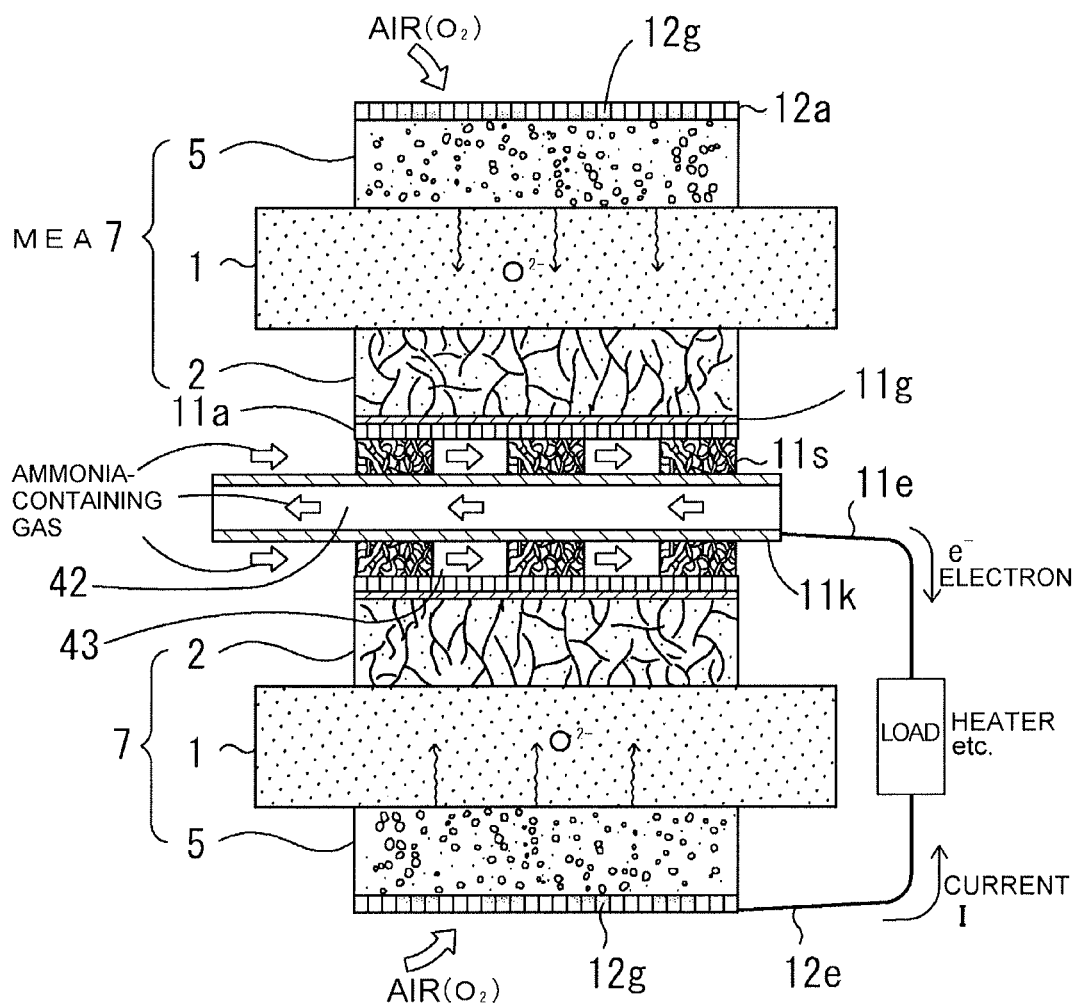
FIG. 3 illustrates the electric wiring system of the gas decomposition component in FIG. 1.

FIG. 3 illustrates the electric wiring system of the gas decomposition component 10 in FIG. 1 when the solid electrolyte layer 1 is oxygen-ion conductive. The first gas containing ammonia is passed through the preheating pipe 53 and then guided through the gas guide pipe 11k into the innermost portion of the inner cylinder of the cylindrical MEA 7, which is highly airtight; that is, the first gas is guided to a region near the sealed portion 44. Since the entirety of the cylindrical MEA 7 is heated by the heater 52 to about 800° C., the temperature of the first gas is increased while the first gas flows through the gas guide pipe 11k. At this time, ammonia in the first gas is decomposed by heating in the gas guide pipe 11k: $2NH_3 \rightarrow N_2 + 3H_2$.

In the case of using the cylindrical MEA 7, for the purpose of making the first gas containing a gas to be decomposed flow and for the purpose of holding the gas guide pipe 11k on the inner-surface side of the cylindrical MEA 7, the porous metal body 11s is used. In view of achieving a low pressure loss, as described above, the porous metal body 11s disposed in the cylindrical channel 43 may be a porous metal-plated body such as Celmet (registered trademark) described above. In the first gas channel, the first gas containing ammonia flows from the inner space 42 to the cylindrical channel 43; while the first gas passes through pores in the porous metal body 11s, the Ni mesh sheet 11a, and the porous silver-paste-coated layer 11g, it comes into contact with the first electrode layer (anode) 2, resulting in an ammonia decomposition reaction described below.

Oxygen ions $O^{2-}$ are generated by an oxygen gas decomposition reaction in the second electrode layer (cathode) 5 and pass through the solid electrolyte layer 1 to reach the first electrode layer (anode) 2. That is, this is an electrochemical reaction in the case where oxygen ions, which are anions, move through the solid electrolyte layer 1.

In the first electrode layer (anode) 2, the following reaction occurs.

(Anode reaction): $2NH_3 + 3O^{2-} \rightarrow N_2 + 3H_2O + 6e^-$

Specifically, a portion of ammonia reacts: $2NH_3 \rightarrow N_2 + 3H_2$. These $3H_2$ react with the oxygen ions $3O^{2-}$ to generate $3H_2O$.

The air, in particular, oxygen gas is passed through the space S and introduced into the second electrode layer (cathode) 5. Oxygen ions dissociated from oxygen molecules in the second electrode layer (cathode) 5 are sent to the solid electrolyte layer 1 toward the first electrode layer (anode) 2.

In the second electrode layer (cathode) 5, the following reaction occurs.

(Cathode reaction): $O_2 + 4e^- \rightarrow 2O^{2-}$

As a result of the electrochemical reaction, electric power is generated; a potential difference is generated between the first electrode layer (anode) 2 and the second electrode layer (cathode) 5; current I flows from the cathode collector 12 to the anode collector 11. When a load, such as the heater 52 for heating the gas decomposition component 10, is connected between the cathode collector 12 and the anode collector 11, electric power for the heater 52 can be supplied. This supply of electric power to the heater 52 may be a partial supply. In most cases, the amount of supply from the self power generation is equal to or lower than half of the overall electric power required for the heater 52.

In the gas decomposition component 10, it is important that, in the first electrode layer (anode) 2 disposed on the inner-surface side of the cylindrical MEA 7, while the electric resistance of the anode collector 11 is made low, the pressure loss in the first gas passing through the anode collector 11 is made low. On the second electrode layer (cathode) 5 side, it is important that the density of contact points between the air serving as the second gas and the second electrode layer (cathode) 5 is made high and the resistance of the cathode collector 12 is made low.

The above-described electrochemical reaction is one in which oxygen ions, which are anions, move through the solid electrolyte layer 1. In another desirable embodiment according to the present invention, for example, the solid electrolyte layer 1 is composed of barium zirconate ($BaZrO_3$) and a reaction is caused in which protons are generated in the first electrode layer (anode) 2 and moved through the solid electrolyte layer 1 to the second electrode layer (cathode) 5.

When a proton-conductive solid electrolyte layer 1 is used, for example, in the case of decomposing ammonia in the first gas, ammonia is decomposed in the first electrode layer (anode) 2 to generate protons, nitrogen molecules, and electrons; the protons are moved through the solid electrolyte layer 1 to the second electrode layer (cathode) 5; and, in the second electrode layer (cathode) 5, the protons react with oxygen to generate water ($H_2O$). Since protons are smaller than oxygen ions, they move through the solid electrolyte layer 1 at a higher speed than oxygen ions. Accordingly, while the heating temperature can be decreased, the decomposition capacity on the practical level can be achieved. In addition, the solid electrolyte layer 1 can be formed so as to have a thickness providing a sufficiently high strength.

FIG. 4 illustrates a connection state between the gas guide pipe 11k and an external wire 11e and a connection state between the cylindrical MEA 7 and the gas introduction pipe 45 and an exhaust pipe 65. These connections are achieved with a pipe joint 30 formed of a fluorocarbon resin.

The pipe joint 30 is connected such that an O-ring 33 contained on the inner-surface side of an engagement portion 31b extending from a body portion 31 of the pipe joint 30 to the solid electrolyte layer 1 butts against the outer surface of the solid electrolyte layer 1 composed of a ceramic, which is a fired body. The engagement portion 31 b of the pipe joint 30 is formed so as to have a tapering outer diameter. This tapered portion is threaded and, to this thread, a circular nut 32 is screwed. By screwing the circular nut 32 in the direction in which the outer diameter increases, the engagement portion 31b is tightened in its outer surface. Thus, the airtightness provided with the O-ring 33 can be adjusted.

The pipe joint 30 includes therein an engagement portion 36 that can be engaged with a base end portion 11d of the gas guide pipe 11k in an airtight manner. Thus, the gas guide pipe 11k is connected to the pipe joint 30 to thereby form the first gas channel.

The pipe joint 30 includes a gas introduction part 31a for achieving a connection with the gas introduction pipe 45 for the first gas. An end portion of the gas introduction pipe 45 is engaged around the outer circumference of the gas introduction part 31a of the pipe joint 30 and fastened with a fastener 47. As a result, a connection that is highly airtight can be obtained. The first gas flows from the gas introduction pipe 45 through the gas introduction part 31a into the gas guide pipe 11k. The first gas having flowed into the gas guide pipe 11k is made to flow through the inner space 42 (refer to FIGS. 1 to 3) to a region near the sealed portion 44 of the cylindrical MEA 7 (refer to FIG. 1).

The pipe joint 30 includes a gas discharge part 31c for achieving a connection with the exhaust pipe 65. An end portion of the gas exhaust pipe 65 is engaged around the outer circumference of the gas discharge part 31c of the pipe joint 30 and fastened with a fastener 67. As a result, a connection that is highly airtight can be obtained. The first gas having flowed through the cylindrical MEA 7 passes through an exhaust space 35 and the gas discharge part 31c in the pipe joint 30 and is discharged into the exhaust pipe 65.

As described above, by employing the pipe joint 30, introduction and discharge of the first gas can be achieved at the same single end of the cylindrical MEA 7 without causing mixing of the first gas to be decomposed and the decomposed first gas.

In the body portion 31 of the pipe joint 30, a conductive penetration part 37c that penetrates the body portion 31 in an airtight manner is provided. To ensure the airtightness, for example, a sealing resin 38 is applied. The conductive penetration part 37c is preferably a cylindrical rod threaded for screwing a nut 39 for the purpose of ensuring electrical connection with the external wire 11e. To the intra-pipe end of the conductive penetration part 37c, a conductive lead 37b is connected. Another end 37a of the conductive lead 37b is bonded to an outer circumferential portion of the gas guide pipe 11k with an annular clamp 34.

By employing the above-described configuration, the connection resistance between the gas guide pipe 11k and the external wire 11e can be decreased.

By winding the external wire 12e around the outer circumference of an end portion of the Ni mesh sheet 12a of the cathode collector 12 (refer to FIG. 1), connection to the outside can be established. Since the second electrode layer (cathode) 5 is positioned on the outer-surface side of the cylindrical MEA 7, the establishment of the connection is less difficult than that from the anode collector 11 (refer to FIG. 1) to the outside.

As illustrated in FIG. 4, both of the connection between the anode collector 11 (refer to FIG. 1) and the external wire 11e and the connection between the pipe joint 30 and the gas introduction pipe 45 and the gas exhaust pipe 65 can be achieved in a small space. In addition, these two connections are disposed at positions that are separated from the main stream of thermal flow from the heater 52. Accordingly, use of a heat-resistant resin or a corrosion-resistant resin such as a fluorocarbon resin can ensure durability for repeated use for a long period of time.

In the present embodiment, the silver-paste-coated layer 11g is disposed as a porous conductive layer on an inner circumferential portion of the first electrode layer (anode) 2; and the Ni mesh sheet 11a is connected to the first electrode layer 2 with the silver-paste-coated layer 11g serving as the porous conductive layer therebetween.

Silver pastes that provide a porous structure by being applied and dried (fired) are commercially available. For example, DD-1240 manufactured by Kyoto Elex Co., Ltd. may be used. By forming the silver-paste-coated layer 11g so as to have a porous structure, a large number of ammonia molecules $NH_3$ enter pores in the porous structure and come into contact with a catalyst in the first electrode layer (anode) 2, increasing the probability of the occurrence of the anode reaction.

To increase the gas decomposition reaction efficiency, the porosity of the silver-paste-coated layer 11g is preferably made 20% to 80%. When the porosity is 20% or less, it becomes difficult to introduce the gas into the conductive-paste-coated layer and the efficiency is not increased. On the other hand, when the porosity is 80% or more, it is difficult to ensure sufficiently high conductivity and the coated layer does not have sufficiently high strength. More preferably, the porosity is made 40% to 60%.

The silver-paste-coated layer 11g may have a thickness of 5 to 300 μm. When the thickness is less than 5 μm, uniform contact with the silver-paste-coated layer 11g is not achieved over the entire region of the Ni mesh sheet 11a and it is difficult to ensure sufficiently high conductivity. On the other hand, when the thickness is more than 300 μm, a paste-coated layer having sufficiently high porosity is difficult to form. In order to ensure conductivity and porosity, the silver-paste-coated layer 11g is more preferably formed so as to have a thickness of 5 to 100 μm.

A process for forming the silver-paste-coated layer 11g is not particularly limited. The silver-paste-coated layer 11g can be formed by, for example, a dipping process in which the cylindrical MEA 7 is dipped in a dipping layer filled with a silver paste or a process in which a coating nozzle is inserted to spray a silver paste on the inner surface of the cylindrical MEA 7.

A process for forming the silver-paste-coated layer 11g so as to be porous is also not particularly limited.

In order to achieve the above-described predetermined porosity, a silver paste containing a predetermined amount of a binder that evaporates at a predetermined temperature may be employed. In order to suppress shrinkage of the conductive-paste-coated layer due to evaporation of a binder, a binder that sublimes is preferably added. For example, a silver paste containing a naphthalene-based binder is preferably employed.

Although a region in which the silver-paste-coated layer 11g is formed is also not particularly limited, the silver-paste-coated layer 11g is preferably formed over the entire surface of the first electrode layer (anode) 2. By forming the silver-paste-coated layer 11g over the entire surface of the first electrode layer (anode) 2, even when a portion of the Ni mesh sheet 12a is separated from the silver-paste-coated layer 11g, the current-collecting capability for the first electrode layer (anode) 2 is not degraded.

A powder material for forming the solid electrolyte layer 1 may be a solid oxide, molten carbonate, phosphoric acid, a solid polymer, or the like. The solid oxide is preferred because it can be used in a small size and easily handled. Preferred examples of the solid oxide include oxygen-ion-conductive oxides such as scandium stabilized zirconia (SSZ), yttrium stabilized zirconia (YSZ), samarium doped ceria (SDC), lanthanum gallate (LSGM), and gadolia-doped ceria (GDC). Alternatively, proton-conductive barium zirconate may be used. The powder materials may be fired by, for example, being held in the air atmosphere at 1000° C. to 1600° C. for 30 to 180 minutes.

The first electrode layer (anode) 2 may be formed as a fired body mainly composed of metal chain particles whose surfaces are oxidized to have oxide layers and an oxygen-ion conductive ceramic. Examples of the oxygen-ion conductive ceramic include SSZ (scandium stabilized zirconia), YSZ (yttrium stabilized zirconia), SDC (samarium doped ceria), LSGM (lanthanum gallate), and GDC (gadolia-doped ceria).

When SSZ is employed, the average particle size thereof is preferably about 0.5 µm to about 50 µm. The firing step may be performed by, for example, holding in the air atmosphere at 1000° C. to 1600° C. for 30 to 180 minutes. A SSZ raw-material powder preferably has an average particle size of about 0.5 µm to about 50 µm. The mixing ratio (mol ratio) of the metal chain particles whose surfaces are oxidized to SSZ is in the range of 0.1 to 10.

The metal of the metal chain particles is preferably nickel (Ni) or iron (Fe)-containing Ni. More preferably, the metal contains titanium (Ti) in a trace amount, about 2 to about 10000 ppm.

The metal chain particles are preferably produced by a reduction precipitation process. This reduction precipitation process for the metal chain particles is described in detail in, for example, Japanese Unexamined Patent Application Publication No. 2004-332047. The metal chain particles contained in the first electrode layer (anode) 2 preferably have an average diameter D of 5 nm or more and 500 nm or less, and an average length L of 0.5 µm or more and 1000 µm or less. The ratio of the average length L to the average diameter D is preferably 3 or more. Note that the metal chain particles may have dimensions that do not satisfy these ranges.

The second electrode layer (cathode) 5 is formed of a fired body mainly composed of an oxygen-ion-conductive ceramic. In this case, examples of the oxygen-ion-conductive ceramic include lanthanum strontium manganite (LSM), lanthanum strontium cobaltite (LSC), and samarium strontium cobaltite (SSC). Such powder materials may also be fired under the above-described conditions.

Figure 5:
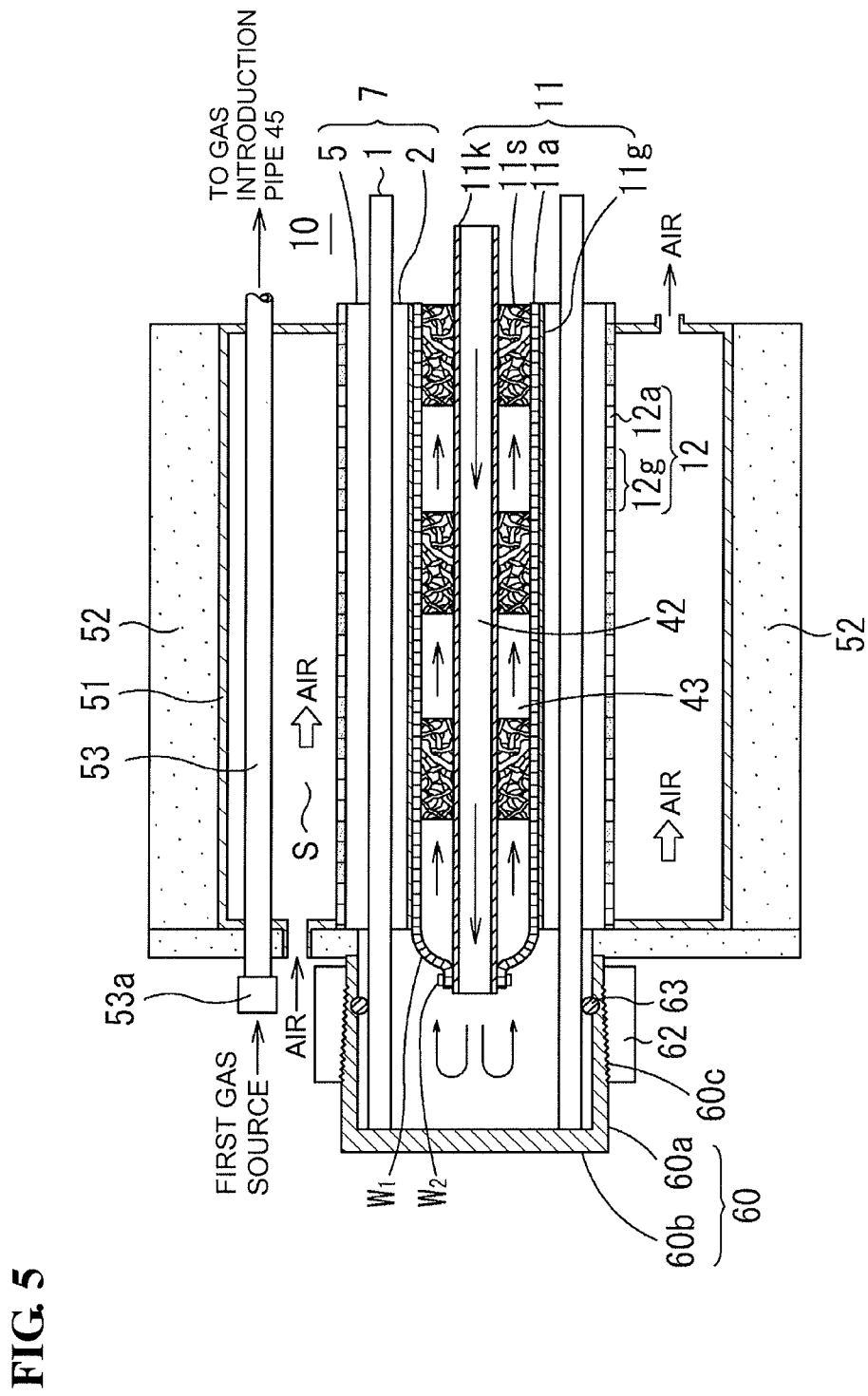
FIG. 5 is a longitudinal sectional configuration view of, on an end side (sealed side), a gas decomposition component according to a modification of a first embodiment of the present invention.

FIG. 5 illustrates a gas decomposition component, on an end side (sealed side), according to a modification of the first embodiment of the present invention. In this modification, an end portion of the cylindrical MEA 7 is sealed with a sealing member 60 to form the sealed portion 44 (refer to FIG. 1). The configurations other than the sealed portion 44 are the same as in the first embodiment and hence are not described.

The sealing member 60 is formed of a heat-resistant resin such as a Teflon (registered trademark) resin. The sealing member 60 includes a side wall portion 60a that can engage with an outer circumferential portion of the solid electrolyte layer 1 and a bottom portion 60b that seals an end of the side wall portion 60a.

The side wall portion 60a is connected such that an O-ring 63 contained on the inner-surface side of the side wall portion 60a butts against the outer surface of the solid electrolyte layer 1 composed of a ceramic, which is a fired body. The side wall portion 60a is formed so as to have a tapering outer diameter in the circumference. This tapered portion is threaded and, to this thread, a circular nut 62 is screwed. By screwing the circular nut 62 in the direction in which the outer diameter increases, a side wall portion 60c is tightened in its outer surface. Thus, the airtightness provided with the O-ring 63 can be adjusted.

By employing the above-described configuration, a gas decomposition component 10 according to the present invention can be easily provided with a cylindrical MEA 7 having two open ends.

In the above-described embodiment, the present invention is applied to a gas decomposition component intended for gas detoxification. The present invention is also applicable to gas decomposition components whose main purpose is not gas detoxification and to cylindrical MEAs of electrochemical reaction apparatuses.

For example, the present invention is also applicable to cylindrical MEAs of fuel cells or the like.

An embodiment of the present invention has been described above. However, the embodiment of the present invention disclosed above is given by way of illustration, and the scope of the present invention is not limited to the embodiment of the invention. The scope of the present invention is indicated by Claims and embraces all the modifications within the meaning and range of equivalency of the Claims.

Figure 6:
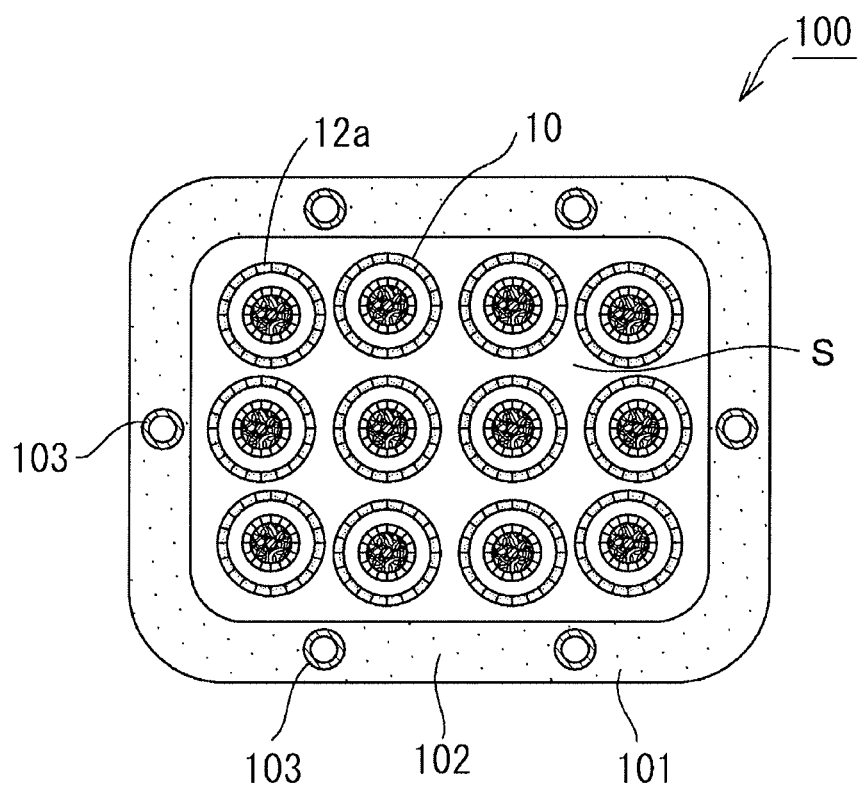
FIG. 6 illustrates a gas decomposition component according to a second embodiment of the present invention, that is, a sectional configuration view of a plurality of gas decomposition components serving as a gas decomposition component group in contrast to the sectional configuration view of a single gas decomposition component in FIG. 2.

FIG. 6 illustrates a gas decomposition component according to a second embodiment of the present invention. FIG. 6 is a sectional configuration view of a plurality of gas decomposition components serving as a gas decomposition component group.

In a gas decomposition component 100 according to the second embodiment, a plurality of gas decomposition components 10 are three-dimensionally arranged in parallel to form a group; an exterior member 101, a heater 102, and preheating pipes 103 are disposed for the entirety of the group. Thus, a single gas decomposition component 100 is provided. Accordingly, in this gas decomposition component 100, the gas decomposition components 10 are not individually equipped with the heater 102 and the preheating pipe 103. In this respect, the gas decomposition component 100 is different from the gas decomposition component 10 of the first embodiment in which the heater 52 and the preheating pipe 53 are dedicated to the single gas decomposition component 10.

In the present embodiment, the exterior member 101 is formed of a refractory material; and, in the exterior member 101, the heater 102 and the preheating pipes 103 are embedded.

The preheating pipes 103 may be disposed so as to extend through the space S inside the exterior member 101. Two or more preheating pipes 103 may be disposed so as to correspond to the number of the gas decomposition components 10 arranged. As the number of the gas decomposition components 10 increases, the supply rate of the first gas also increases. For this reason, the number of the preheating pipes 103 is preferably increased accordingly. The preheating pipes 103 formed so as to have a large pipe diameter may be used.

The heater 102 may be provided as the exterior member 101 serving as a heater.

Industrial Applicability

A gas decomposition component, a power generation apparatus, and a method for decomposing a gas that operate at a low running cost and have a small size and high performance can be provided.

REFERENCE SIGNS LIST 1 solid electrolyte layer
2 first electrode layer (anode)
5 second electrode layer (cathode)
7 cylindrical MEA
10 gas decomposition component
11 anode collector 11a Ni mesh sheet
11d base end portion
11e external wire
11g silver-paste-coated layer
11k gas guide pipe
11s porous metal body
12 cathode collector
12a Ni mesh sheet
12g silver-paste-coated wiring
12e external wire
30 pipe joint
31 body portion
31a gas introduction part
31b engagement portion
31c gas discharge part
32 circular nut
33 O-ring
34 clamp
35 exhaust space
36 engagement portion
37a another end
37b conductive lead
37c conductive penetration part
38 sealing resin
39 nut
42 inner space
43 cylindrical channel
44 sealed portion
45 gas introduction pipe
46 exhaust space
47 fastener
51 exterior member
52 heater
53 preheating pipe
53a connection end
60 sealing member
60a side wall portion
60b bottom portion
60c side wall portion
62 circular nut
63 O-ring
65 exhaust pipe
67 fastener
100 gas decomposition component
101 exterior member
102 heater
103 preheating pipe
S space
$W_1$ end portion of Ni mesh sheet
$W_2$ connection member

The invention claimed is:

1. A gas decomposition component comprising a cylindrical membrane electrode assembly MEA including a cylindrical solid electrolyte layer, a first electrode layer formed on an inner circumferential portion of the solid electrolyte layer in a layered structure, and a second electrode layer formed on an outer circumferential portion of the solid electrolyte layer in a layered structure; a first gas channel through which a first gas that is decomposed flows, the first gas channel being disposed inside the cylindrical MEA; and a second gas channel through which a second gas flows, the second gas channel being disposed outside the cylindrical MEA, wherein the gas decomposition component further comprises a heater for heating an entirety of the component; and a preheating pipe through which the first gas to be introduced into the first gas channel passes beforehand to be preheated, and wherein a sealed portion for sealing an end portion of the cylindrical MEA is provided, a gas guide pipe is inserted through another end portion of the cylindrical MEA into an inner space of the cylindrical MEA to form a cylindrical channel between the gas guide pipe and an inner circumferential surface of the cylindrical MEA, and in the first gas channel, the first gas flowing through the gas guide pipe toward the sealed portion is made to flow out of the gas guide pipe in a region near the sealed portion so that a flow direction of the first gas is reversed and the first gas flows through the cylindrical channel in a direction opposite to the flow direction in the guide pipe.

2. The gas decomposition component according to claim 1, wherein the gas decomposition component comprises one or more of the cylindrical MEAs, and each cylindrical MEA is provided with the heater and the preheating pipe.

3. The gas decomposition component according to claim 1, wherein the gas decomposition component comprises two or more of the cylindrical MEAs, and a plurality of the cylindrical MEAs share the heater and the preheating pipe.

4. The gas decomposition component according to claim 1, wherein the gas guide pipe is formed of a conductive material, and the gas guide pipe is electrically connected to the first electrode layer to constitute a collector for the first electrode layer.

5. The gas decomposition component according to claim 1, wherein a conductive metal mesh sheet is disposed on an inner circumferential surface of the first electrode layer, and the metal mesh sheet is connected to the gas guide pipe to establish an electrical connection between the first electrode layer and the gas guide pipe.

6. The gas decomposition component according to claim 1, wherein a porous conductive layer is disposed on a surface of the first electrode layer.

7. The gas decomposition component according to claim 1, wherein the end portion of the cylindrical MEA is sealed with a bottom portion formed from an extension of the solid electrolyte layer.

8. The gas decomposition component according to claim 1, wherein the end portion of the cylindrical MEA is sealed with a sealing member engaged with the end portion of the cylindrical MEA.

9. The gas decomposition component according to claim 1, wherein the first electrode layer and/or the second electrode layer is a fired body containing an ion-conductive ceramic and metal chain particles mainly containing nickel (Ni).

10. The gas decomposition component according to claim 1, wherein the solid electrolyte layer has oxygen-ion conductivity or proton conductivity.

11. A power generation apparatus comprising the gas decomposition component according to claim 1.

12. A method for decomposing a gas, the method being performed with a gas decomposition component including a cylindrical membrane electrode assembly MEA including a cylindrical solid electrolyte layer, a first electrode layer formed on an inner circumferential portion of the solid electrolyte layer in a layered structure, and a second electrode layer formed on an outer circumferential portion of the solid electrolyte layer in a layered structure; a first gas channel through which a first gas that is decomposed flows, the first gas channel being disposed inside the cylindrical MEA; and a second gas channel through which a second gas flows, the second gas channel being disposed outside the cylindrical MEA, wherein the first gas to be introduced into the first gas channel is preheated with a heater for heating an entirety of the component, and wherein a sealed portion for sealing an end portion of the cylindrical MEA is provided, a gas guide pipe is inserted through another end portion of the cylindrical MEA into an inner space of the cylindrical MEA to form a cylindrical channel between the gas guide pipe and an inner circumferential surface of the cylindrical MEA, and in the first gas channel, the first gas flowing through the gas guide pipe toward the sealed portion is made to flow out of the as tide se in a re on near the sealed portion so that a flow direction of the first gas is reversed and the first gas flows through the cylindrical channel in a direction opposite to the flow direction in the guide pipe.

* * * * *